Nov. 18, 1947. J. L. JOHNSON 2,431,045
METHOD OF WINDING COILS
Filed Oct. 20, 1943
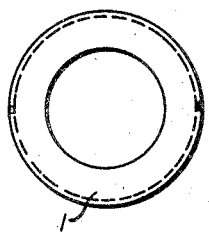
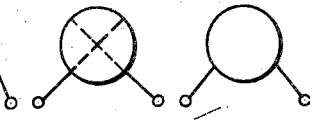
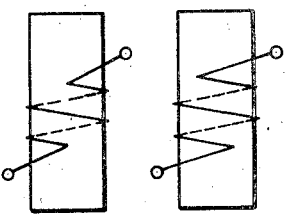
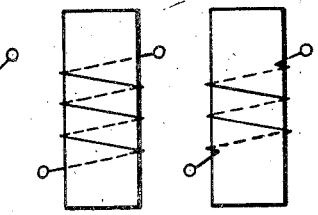
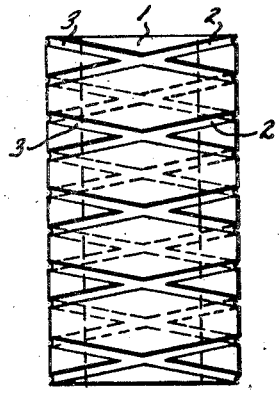
INVENTOR
John L. Johnson
BY
ATTORNEY Patented Nov. 18, 1947

2,431,045

UNITED STATES PATENT OFFICE 2,431,045

METHOD OF WINDING COILS

John L. Johnson, Catonsville, Md., assignor to Westinghouse Electric Corporation, East Pittsburgh, Pa., a corporation of Pennsylvania Application October 20, 1943, Serial No. 506,980

2 Claims. (Cl. 153—2)

My invention relates to methods of winding coils for use in electrical circuits and in particular relates to an improved type of form on which such coils may be wound.

For many purposes, particularly as inductances for use in radio circuits, it is customary to employ electrical conductors wound into the form of a single layer helix. It is essential that both the diameter and the spacing between turns of the helix shall correspond with previously determined values determined by considerations of circuit design. Where there are only a total of a few turns in the helix, say for example two or three, considerable difficulty arises in accurately forming fractions of a turn, such for example, as to assure that a helix shall have the equivalent of 2¾ turns, inasmuch as voltages are likely to be induced in the flexible leads used to connect the coil into circuit with other apparatus by the magnetic field of the solenoid causing such leads to become in effect a fractional additional turn unless such leads are positioned in certain ways to prevent such an effect. It is also often necessary to have helices which differ from each other slightly, but to a predetermined degree, in the number of their turns and to be able to use them alternately in a particular location in a radio set. This latter limitation means that the coils must be supplied with leads which can be connected and disconnected from a fixed set of binding posts. It is, of course, highly necessary to be able to make coils which are exact duplicates of each other and which fulfil the requirements enumerated above.

I have found that in order to obtain coils which may be connected to a given fixed set of binding posts in a radio set but which shall differ from each other by a fraction of a turn, it is frequently of assistance if one of the coils is wound as a right-handed helix and the other coil a left-handed helix, the helices having the same diameter and pitch.

One object of my invention is accordingly, to provide an arrangement for winding wire helices of the same diameter and pitch which have either right-handed or left-handed turns.

Another object of my invention is to provide an arrangement adapted for use in quantity production for producing at will windings of opposite sense, that is either right-handed or left-handed helical windings of the same diameter and pitch.

Other objects of my invention will become apparent when reading the following description taken in connection with the drawings, in which:

Figure 1 shows in elevation, and Fig. 2 in plan, a winding form for use in carrying out my invention;

Figs. 3 to 7 are diagrammatic views in elevation with Figs. 8 to 12 corresponding to plan views of helical coils with left-hand turns from 2 to 2¾ turns in number; and Figs. 13 to 17 and 18 to 22 are respectively similar diagrammatic views in elevation and plan of helical windings with right-hand turns of the same numbers.

Referring in detail to Fig. 1, I provide a form 1 in the form of a cylinder having on its surface a right-handed helical groove 2 and a left-handed helical groove 3, each being of the pitch which is desired for a finished coil and of cross-sectional dimension corresponding to those of the wire form on which the coil is to be wound. When it is desired to wind a right-handed helix, the wire is then wound in the groove 2 and when it is desired to wind the left-handed helix the wire is wound in the groove 3. After the winding operation is completed the form may be removed from the helix by merely unscrewing it from the latter, the wires of the helix remaining undistorted since they traverse a groove of constant pitch and diameter. Before or after removal from the form, the wires may be bent out of the groove at the points corresponding to the total number of turns desired and the turns fixed in position relative to each other by attaching to them suitable rigid longitudinal supports.

Particularly in the case of small-diameter forms, and certain forms made of molded plastics, it may be desirable to reduce the diameter of the formed coil, by pulling or otherwise, to the full depth of the grooves in the two diametrically opposite sectors where the right-hand and left-hand helices intersect each other.

The convenience of being able to choose between a left-hand and a right-hand helix when a certain number of turns is desired will be evident from considering Figs. 4 and 9 representing a 2¼ turn left-hand-wound coil and Figs. 14 and 19 representing a 2¼ turn right-hand-wound coil. Examination of Fig. 19, for example, will show that the leads running from the coil to the binding posts are almost radial in direction while Fig. 9 will show that the leads in the case of a left-hand-wound coil of the same number of turns would be nearly tangential to the helix for a substantial portion of their length. Such tangential leads lie within the magnetic field set up by the turns of the helix itself in such a position that the electromotive forces induced in them by this field are of considerable magnitude thus making the supposed inductance of the coil differ from the value it should have to correspond with the fact that it is a nominal 2¼ turn coil. In contrast to this the radial leads of the right-hand-wound coil shown in Figs. 14 and 19 would, by reason of their direction relative to the magnetic field, have almost no electromotive force induced in them and the inductance of the coil would correspond quite accurately to its rating as a 2¼ turn coil.

While I have employed the term helix and helical winding in the description and claims, it is to be understood that this term is not to be limited to a line on a cylinder of circular cross-section but is intended to cover lines of advancing pitch on a surface of cylinders of any other cross-section, such for example, as ellipses, polygons or the like.

While in accordance with the patent statutes I have described a particular embodiment of the principles of my invention, these principles are of broader application in ways which will be evident to those skilled in the art.

I claim as my invention:

1. The method of winding helical type inductance coils of the same or opposite sense and of whole or fractional turns comprising, winding the coil wire the desired number of turns in the selected groove of a mandrel having both right and left hand helical type grooves, bending the coil ends in a direction away from said mandrel, and terminating said bent ends at points adjacent fixed terminal point locations, said method including the step of removing the formed coil from said mandrel.

2. The method of winding helical type inductance coils of the same or opposite sense and of whole or fractional turns comprising, winding the coil wire the desired number of turns in the selected groove of a mandrel having both right and left hand helical type grooves running from end to end, applying tension to the coil to reduce its diameter to that of the base of one of said grooves, bending the coil ends in a direction away from said mandrel, and terminating said bent ends at points adjacent fixed terminal point locations, said method including the step of unscrewing the formed coil from one end of said mandrel.

JOHN L. JOHNSON.

REFERENCES CITED

The following references are of record in the file of this patent:

UNITED STATES PATENTS

| Number | Name | Date |
|---|---|---|
| 133,994 | Lakin | Dec. 17, 1872 |
| 174,117 | Clark | Feb. 29, 1876 |
| 500,279 | Criggal | June 27, 1893 |
| 1,704,067 | Wick | Mar. 5, 1929 |
| 1,837,294 | Scheid | Dec. 22, 1931 |

FOREIGN PATENTS

| Number | Country | Date |
|---|---|---|
| 20,307 | Great Britain | Sept. 28, 1908 |
| 117,206 | Australia | July 15, 1943 |